United States Patent
Palmer et al.

(10) Patent No.: US 9,259,701 B2
(45) Date of Patent: Feb. 16, 2016

(54) METHOD FOR MAKING SOLID BEADS

(75) Inventors: Daniel Palmer, Cardiff (GB); Owen Shadick, Derby (GB)

(73) Assignee: Q CHIP LTD., Cardiff (GB)

( * ) Notice: Subject to any disclaimer, the term of this patent is extended or adjusted under 35 U.S.C. 154(b) by 138 days.

(21) Appl. No.: 13/876,780

(22) PCT Filed: Sep. 30, 2011

(86) PCT No.: PCT/GB2011/051859
§ 371 (c)(1),
(2), (4) Date: Jun. 13, 2013

(87) PCT Pub. No.: WO2012/042274
PCT Pub. Date: Apr. 5, 2012

(65) Prior Publication Data
US 2013/0256931 A1    Oct. 3, 2013

(30) Foreign Application Priority Data
Sep. 30, 2010    (GB) .................................. 1016436.6

(51) Int. Cl.
| | | |
|---|---|---|
| *B01J 2/06* | (2006.01) | |
| *B01J 2/18* | (2006.01) | |
| *B01J 2/08* | (2006.01) | |

(52) U.S. Cl.
CPC .... *B01J 2/06* (2013.01); *B01J 2/08* (2013.01); *B01J 2/18* (2013.01)

(58) Field of Classification Search
None
See application file for complete search history.

(56) References Cited

U.S. PATENT DOCUMENTS

| | | | | |
|---|---|---|---|---|
| 3,845,179 A | * | 10/1974 | Wace | ............................... 264/14 |
| 4,043,507 A | * | 8/1977 | Wace | ........................... 239/102.2 |
| 4,375,347 A | * | 3/1983 | Lombardo et al. | ............... 425/10 |
| 4,929,400 A | | 5/1990 | Rembaum et al. | |
| 4,938,763 A | | 7/1990 | Dunn et al. | |
| 5,019,400 A | | 5/1991 | Gombotz et al. | |
| 5,232,707 A | | 8/1993 | Lokensgard | |
| 5,278,201 A | | 1/1994 | Dunn et al. | |
| 5,324,519 A | | 6/1994 | Dunn et al. | |
| 5,330,767 A | | 7/1994 | Yamamoto et al. | |
| 5,415,679 A | | 5/1995 | Wallace | |

(Continued)

FOREIGN PATENT DOCUMENTS

| | | |
|---|---|---|
| CN | 101160167 | 4/2008 |
| EP | 1142567 | 10/2001 |

(Continued)

OTHER PUBLICATIONS

Branski et al.: "A microfluidic droplet generator based on a piezo-electric actuator"; Lab on a Chip, The Royal Society of Chemistry (2009), vol. 9, pp. 516-520.

(Continued)

*Primary Examiner* — Mary F Theisen
(74) *Attorney, Agent, or Firm* — Hamre, Schumann, Mueller & Larson P.C.

(57) ABSTRACT

A method of forming solid beads, the method comprising:
Providing a first liquid comprising a solute and a solvent
Forming liquid droplets of the first liquid
Contacting the liquid droplets with a second liquid so as to cause the solvent to exit the droplets, thus forming solid beads,
the solute comprising a polymer, the concentration of polymer in the first liquid being at least 7% w/v.,
the solubility of the solvent in the second liquid being at least 5 g of solvent per 100 ml of second liquid.

15 Claims, 5 Drawing Sheets

(56) References Cited

U.S. PATENT DOCUMENTS

| | | | |
|---|---|---|---|
| 5,476,663 | A | 12/1995 | Okada et al. |
| 5,480,656 | A | 1/1996 | Okada et al. |
| 5,500,162 | A | 3/1996 | Theisen et al. |
| 5,534,269 | A | 7/1996 | Igari et al. |
| 5,538,739 | A | 7/1996 | Bodmer et al. |
| 5,575,987 | A | 11/1996 | Kamei et al. |
| 5,599,552 | A | 2/1997 | Dunn et al. |
| 5,631,020 | A | 5/1997 | Okada et al. |
| 5,631,021 | A | 5/1997 | Okada et al. |
| 5,639,480 | A | 6/1997 | Bodmer et al. |
| 5,643,607 | A | 7/1997 | Okada et al. |
| 5,688,530 | A | 11/1997 | Bodmer et al. |
| 5,705,197 | A | 1/1998 | Van Hamont et al. |
| 5,716,640 | A | 2/1998 | Kamei et al. |
| 5,733,950 | A | 3/1998 | Dunn et al. |
| 5,739,176 | A | 4/1998 | Dunn et al. |
| 5,753,618 | A | 5/1998 | Cavanak et al. |
| 5,814,342 | A | 9/1998 | Okada et al. |
| 5,876,761 | A | 3/1999 | Bodmer et al. |
| 5,891,212 | A | 4/1999 | Tang et al. |
| 5,922,338 | A | 7/1999 | Brich et al. |
| 5,922,682 | A | 7/1999 | Brich et al. |
| 5,945,126 | A | 8/1999 | Thanoo et al. |
| 6,036,976 | A | 3/2000 | Takechi et al. |
| 6,083,454 | A | 7/2000 | Tang et al. |
| 6,153,129 | A | 11/2000 | Herbert et al. |
| 6,270,700 | B1 | 8/2001 | Ignatious |
| 6,270,802 | B1 | 8/2001 | Thanoo et al. |
| 6,361,798 | B1 | 3/2002 | Thanoo et al. |
| RE37,950 | E | 12/2002 | Dunn et al. |
| 6,565,874 | B1 | 5/2003 | Dunn et al. |
| 6,626,870 | B1 | 9/2003 | Yarborough et al. |
| 6,737,287 | B1 | 5/2004 | Furuse et al. |
| 6,998,074 | B1 | 2/2006 | Radulescu |
| 7,208,106 | B2 | 4/2007 | Shekunov et al. |
| 7,455,797 | B2 | 11/2008 | Shekunov et al. |
| 7,985,058 | B2 * | 7/2011 | Gray ............... 425/7 |
| 2002/0001608 | A1 | 1/2002 | Polson et al. |
| 2002/0054912 | A1 | 5/2002 | Kim et al. |
| 2002/0160109 | A1 | 10/2002 | Yeo et al. |
| 2002/0193290 | A1 | 12/2002 | Feldstein et al. |
| 2003/0133964 | A1 | 7/2003 | Dunn et al. |
| 2003/0230819 | A1 | 12/2003 | Park et al. |
| 2004/0022939 | A1 | 2/2004 | Kim et al. |
| 2004/0026319 | A1 | 2/2004 | Chattopadhyay et al. |
| 2004/0126431 | A1 | 7/2004 | Lagarce et al. |
| 2004/0126437 | A1 | 7/2004 | Ribeiro |
| 2005/0106257 | A1 | 5/2005 | Albayrak |
| 2005/0206023 | A1 | 9/2005 | Hanna et al. |
| 2006/0055745 | A1 | 3/2006 | Yagi |
| 2007/0154560 | A1 | 7/2007 | Hyon |
| 2007/0196416 | A1 | 8/2007 | Li et al. |
| 2007/0264341 | A1 | 11/2007 | Lee et al. |
| 2008/0019904 | A1 | 1/2008 | Boehmer et al. |
| 2008/0075777 | A1 | 3/2008 | Kennedy |
| 2008/0223720 | A1 | 9/2008 | Yamanaka et al. |
| 2008/0300339 | A1 | 12/2008 | Wright et al. |
| 2009/0004283 | A1 | 1/2009 | Petersen et al. |
| 2009/0035579 | A1 * | 2/2009 | Coufal et al. ............... 428/403 |
| 2009/0304788 | A1 | 12/2009 | Kim et al. |
| 2010/0092778 | A1 | 4/2010 | Watanabe et al. |
| 2010/0237523 | A1 * | 9/2010 | Bohmer et al. ............... 264/13 |
| 2011/0160134 | A1 * | 6/2011 | Palmer et al. ............... 514/9.7 |
| 2013/0256931 | A1 | 10/2013 | Palmer et al. |
| 2013/0259961 | A1 * | 10/2013 | Palmer et al. ............... 425/10 |

FOREIGN PATENT DOCUMENTS

| | | |
|---|---|---|
| EP | 2103313 | 9/2009 |
| EP | 1355630 | 11/2009 |
| GB | 1048697 | 11/1966 |
| GB | 1297476 | 11/1972 |
| JP | H11-244683 | 9/1999 |
| JP | 2005-279523 | 10/2005 |
| JP | 2007-38117 | 2/2007 |
| JP | 2008-80330 | 4/2008 |
| JP | 2008-150596 | 7/2008 |
| JP | 2011-524250 | 9/2011 |
| WO | WO 00/27520 | 5/2000 |
| WO | WO 2007/071395 | 6/2007 |
| WO | WO 2008/062908 | 5/2008 |
| WO | WO 2009/053885 | 4/2009 |
| WO | 2010/004253 | 1/2010 |
| WO | WO 2010/004253 | 1/2010 |

OTHER PUBLICATIONS

Wang et al.: "A novel high-performance counter electrode for dye-sensitized solar cells"; Electrochimica Acta (2005), vol. 50, pp. 5546-5552.

Schober et al.: "Accurate High-Speed Liquid Handling of Very Small Biological Samples"; BioTechniques, vol. 15, No. 2 (1993), p. 324— (6 pages).

Berkland et al.: "Fabrication of PLG microspheres with precisely controlled and monodisperse size distributions"; Journal of Controlled Release, vol. 73 (2001), pp. 59-74.

Fletcher et al.: "Fabrication of polymer microsphere particle standards containing trace explosives using an oil/water emulsion solvent extraction piezoelectric printing process"; Talanta, Elsevier Science B.V., vol. 76 (2008), pp. 949-955.

Choy, Y.B.: "Niacromol. Biosci. Apr. 2007"; Macromolecular Bioscience (2007), vol. 7, p. 389.

Sah, Hongkee: "Microencapsulation techniques using ethyl acetate as a dispersed solvent: effects of its extraction rate on the characteristics of PLGA microspheres"; Journal of Controlled Release, vol 47 (1997), pp. 233-245.

Veldhuis et al.: "Monodisperse Microsphneres for Parenteral Drug Delivery"; Parenteral Delivery, Jan. 2009, vol. 9, No. 1 (5 pages).

Baxter Healthcare Corporation: "Pulmonary Formulation"; Drug Delivery Technology, Oct. 2006, vol. 6, No. 9 (1 page).

Choy et al.: "Uniform Biodegradable Hydrogel Microspheres Fabricated by a Surfactant-Free Electric-Field-Assisted Method"; Macromolecular Bioscience (2007), vol. 7, pp. 423-428.

Choy et al.: "Uniform Ethyl Cellulose Microspheres of Controlled Sizes and Polymer Viscosities and Their Drug-Release Profiles"; Journal of Applied Polymer Science, vol. 112 (2009), pp. 850-857.

Radulescu et al.: "Uniform Paclitaxel-Loaded Biodegradable Microspheres Manufactured by Ink-jet Technology"; Proc., Recent Adv. in Drug Delivery Sys. Mar. 2003 (6 pages).

Form PTO-892, issued in co-pending U.S. Appl. No. 13/876,773, Oct. 6, 2014.

Japanese Office action and English Translation for Corresponding Japanese Application No. 2013-530800, Dated Sep. 30, 2015, 10 pgs. (Office Action pp. 1-5, Translation pp. 6-10).

Japanese Office action and English Translation for Corresponding Japanese Application No. 2013-530799, Dated Sep. 30, 2015, 21 pgs. (Office Action pp. 1-11, Translation pp. 12-21).

* cited by examiner

METHOD FOR MAKING SOLID BEADS

The present invention relates to a method of making solid beads particularly, but not exclusively, solid beads incorporating biocompatible polymers and one or more pharmaceutically active ingredients.

Solid beads comprising one or more pharmaceutically active agent (or precursor thereof) are known. Such beads may be used in what is known as a "depot injection" to deliver the pharmaceutically active agent to a patient over a period of time. Such beads are often polydisperse and therefore the drug release profile is hard to predict and/or control. Furthermore, it may be difficult to modify the processing of the beads in order to control the release profile of the beads in a desirable and predictable manner.

Solid beads have been produced using many techniques. For example, the generation of beads using piezoelectric dispensers is known, whereby a piezoelectric dispenser is used to produce a droplet of a liquid comprising a polymer dissolved in a solvent. The solvent is extracted from the liquid droplets by depositing the droplets into a liquid in which the solvent (but not the polymer) is soluble, thus leaving behind a solid bead. Many of these methods teach that extraction of the solvent occurs slowly (for example, over a period of hours). In other known methods, the formation of a solid bead may occur by a mechanism of simultaneous evaporation and extraction. Solid beads have also been made using microfluidic devices. Droplets of liquid comprising a polymer may be formed in a conduit. These droplets are then frozen in-conduit and brought into contact with an antisolvent in a conduit, the antisolvent dissolving the solvent in the frozen droplet to produce a solid bead. Whilst this technique may be used to successfully produce beads of a consistent size, it may be difficult to scale-up such a device or technique for commercial production.

The present invention seeks to mitigate one or more of the problems of the prior art mentioned above.

In accordance with a first aspect of the present invention, there is provided a method of forming solid beads, the method comprising:
Providing a first liquid comprising a solute and a solvent
Forming liquid droplets of the first liquid
Contacting the liquid droplets with a second liquid so as to cause the solvent to exit the droplets, thus forming solid beads,
the solute comprising a polymer, the concentration of polymer in the first liquid being at least 7% w/v.,
the solubility of the solvent in the second liquid being at least 5 g of solvent per 100 ml of second liquid.

The weight ('w') referred to above is the weight of the polymer and the volume ('v') referred to in the "% w/v" calculation is the volume of the solvent.

The solubility of the solvent with the second liquid is assessed at temperature at which solvent and second liquid are brought into contact.

The solubility of the solvent in the second liquid may be at least 10 g/100 ml and optionally at least 20 g/100 ml. The solvent may be substantially miscible with the second liquid.

The beads may have a coefficient of variation of the greatest dimension of the beads of 0.1 or less (and optionally of 0.06 or less), the coefficient of variation being the standard deviation of the greatest dimension of the beads divided by the mean greatest dimension.

In accordance with a second aspect of the present invention, there is provided a method of forming solid beads having a coefficient of variation of greatest dimension of 0.1 or less, the method comprising:

Providing a first liquid comprising a solute and a solvent
Forming liquid droplets of the first liquid
Contacting the liquid droplets with a second liquid so as to cause the solvent to exit the droplets, thus forming solid beads,
the solute comprising a polymer, the concentration of polymer in the first liquid being at least 7% w/v.

The weight ('w') referred to above is the weight of the polymer and the volume ('v') referred to in the "% w/v" calculation is the volume of the solvent. The coefficient of variation of the mean greatest dimension may be 0.06 or less. The coefficient of variation is the standard deviation of the greatest dimension divided by the mean greatest dimension.

In the method of the second aspect of the present invention, the solubility of the solvent in the second liquid may be at least 5 g of solvent per 100 ml second liquid, optionally at least 10 g/100 ml and optionally at least 20 g/100 ml. The solvent may be substantially miscible with the second liquid.

In the methods of the first and second aspects of the present invention, the method may comprise providing a liquid droplet generator comprising a piezoelectric component operable to generate droplets and causing the liquid droplet generator to form droplets of the first liquid.

In accordance with a third aspect of the present invention, there is provided a method of forming solid beads, the method comprising:
Providing a first liquid comprising a solute and a solvent
Providing a liquid droplet generator comprising a piezoelectric component operable to generate droplets
Causing the liquid droplet generator to form droplets of the first liquid
Contacting the liquid droplets with a second liquid so as to cause the solvent to exit the droplets, thus forming solid beads,
the solute comprising a polymer, the concentration of polymer in the first liquid being at least 7% w/v.

The weight ('w') referred to above is the weight of the polymer and the volume ('v') referred to in the "% w/v" calculation is the volume of the solvent.

In the method of the third aspect of the present invention, the solubility of the solvent in the second liquid may be at least 5 g of solvent per 100 ml second liquid, optionally at least 10 g/100 ml and optionally at least 20 g/100 ml. The solvent may be substantially miscible with the second liquid. Furthermore, the beads may have a coefficient of variation of the greatest dimension of the beads 0.1 or less (optionally 0.06 or less), the coefficient of variation being the standard deviation of the greatest dimension of the beads divided by the mean greatest dimension.

In the methods of the first, second and third aspects of the present invention, the concentration of the polymer in the first liquid may optionally be at least 10% w/v, optionally at least 15% w/v, further optionally at least 20% w/v, optionally from 15 to 35% w/v, optionally from 20 to 45% w/v and further optionally from 30 to 45% w/v. The weight ('w') referred to above is the weight of the polymer and the volume ('v') referred to in the "% w/v" calculation is the volume of the solvent.

Furthermore, in the methods of the first, second and third aspects of the present invention, the solvent may be non-aqueous.

In accordance with a fourth aspect of the present invention, there is provided a method of forming solid beads, the method comprising:
Providing a first liquid comprising a solute and a solvent
Forming liquid droplets of the first liquid Contacting the liquid droplets with a second liquid so as to cause the solvent to exit the droplets, thus forming solid beads,
the solute comprising a polymer,
the solvent being non-aqueous and having a solubility of at least 5 g per 100 ml second liquid. The solvent may have a solubility in the second liquid of at least 10 g/100 ml and optionally at least 20 g/100 ml. The solvent may be substantially miscible with the second liquid.

Non-aqueous solvents may comprise a small amount (up to 10% by volume) of water, but optionally comprise up to 5% by volume, optionally comprise up to 2% by volume of water. The non-aqueous solvent may be substantially devoid of water.

The concentration of polymer in the first liquid may be at least 7% w/v, optionally at least 10% w/v, optionally at least 15% w/v, optionally at least 20% w/v, optionally from 15 to 35%, optionally be from 20 to 45% w/v and further optionally from 30 to 45% w/v. The weight ('w') referred to above is the weight of the polymer and the volume ('v') referred to in the "% w/v" calculation is the volume of the solvent. Furthermore, the beads may have a coefficient of variation of the greatest dimension of the beads of 0.1 or less (optionally 0.06 or less), the coefficient of variation being the standard deviation of the greatest dimension of the beads divided by the mean greatest dimension.

The method may comprise providing a liquid droplet generator comprising a piezoelectric component operable to generate droplets and causing the liquid droplet generator to form droplets of the first liquid.

In the methods of the first, second, third and fourth aspects of the present invention, the time taken for the formation of solid beads from initial contact of the liquid droplet with the second liquid may be less than 15 minutes, optionally less than 5 minutes, further optionally less than 2 minutes and further optionally less than 1 minute. It is relatively simple to determine whether solid beads have been formed; they can be clearly observed to be solid, due to a significant change in opacity under a light-microscope. They do not merge as liquid droplets merge, and they can be handled without merging.

In accordance with a fifth aspect of the present invention, there is provided a method of forming solid beads, the method comprising:
Providing a first liquid comprising a solute and a solvent
Forming liquid droplets of the first liquid
Contacting the liquid droplets with a second liquid so as to cause the solvent to exit the droplets, thus forming solid beads,
the solute comprising a polymer, the concentration of polymer in the first liquid being at least 7% w/v.,
wherein the time taken for the formation of solid beads from initial contact of the liquid droplet with the second liquid may be less than 15 minutes.

The weight ('w') referred to above is the weight of the polymer and the volume ('v') referred to in the "% w/v" calculation is the volume of the solvent.

It is preferred that the time taken for the formation of solid beads from the initial contact of the liquid droplet with the second liquid may be optionally less than 5 minutes, further optionally less than 2 minutes and further optionally less than 1 minute.

Furthermore, the beads may have a coefficient of variation of the greatest dimension of the beads of less than 0.1, the coefficient of variation being the standard deviation of the greatest dimension of the beads divided by the mean greatest dimension.

The method may comprise providing a liquid droplet generator comprising a piezoelectric component operable to generate droplets and causing the liquid droplet generator to form droplets of the first liquid.

The concentration of polymer in the first liquid may be at least 10% w/v, optionally at least 15% w/v, optionally at least 20% w/v, optionally from 15 to 35%, optionally be from 20 to 45% w/v and further optionally from 30 to 45% w/v. The weight ('w') referred to above is the weight of the polymer and the volume ('v') referred to in the "% w/v" calculation is the volume of the solvent.

For the avoidance of confusion, the statements below relate to the methods of the first, second, third, fourth and fifth aspects of the present invention.

Whilst not wishing to be bound by theory, it is thought that the solvent dissolves in the second liquid to try to reach an equilibrium. Since the solvent is substantially miscible with the second liquid, and the second liquid is in a large volumetric excess, the solvent rapidly equilibrates into the second liquid, and away from the solute.

The method may comprise passing said liquid droplets through a gas into contact with the second liquid. The method may comprise ejecting said liquid droplets through a gas into contact with the second liquid. The method may additionally or alternatively comprise passing liquid droplets through a gas under the influence of gravity into contact with the second liquid. For example, a piezoelectric dispenser ejects droplets downwards with a non-zero initial velocity. The droplets also fall under the influence of gravity if the piezoelectric dispenser is arranged to dispense droplets downwards.

The droplets may pass through from 1-50 mm of gas (typically air), optionally from 1 to 30 mm, further optionally from 2 to 25 mm and more optionally from 3 to 20 mm.

The methods of the present invention may typically be used to make solid beads having a mean greatest dimension of from 10 to 200 µm, preferably 20 to 150 µm and more preferably 40 to 120 µm. It is preferred that the solid beads are substantially spherical.

The ratio of the mean diameter of the liquid droplets to the mean largest dimension of the beads (typically the mean diameter, if the beads are substantially spherical) may be less than about 4:1, optionally less than about 3:1, further optionally less than about 2:1 and optionally less than about 1.5:1. The size of droplets may be measured, for example, using a high speed camera.

The polymer is typically a biocompatible polymer. "Biocompatible" is typically taken to mean compatible with living cells, tissues, organs, or systems, and posing no risk of injury, toxicity, or rejection by the immune system. Examples of polymers which may be used are polylactides (with a variety of end groups), such as Purasorb PDL 02A, Purasorb PDL 02, Purasorb PDL 04, Purasorb PDL 04A, Purasorb PDL 05, Purasorb PDL 05A Purasorb PDL 20, Purasorb PDL 20A; polyglycolides (with a variety of end groups), such as Purasorb PG 20; polycaprolactones; polyanhydrides, and copolymers of lactic acid and glycolic acid (with a variety of end groups, L:G ratios and molecular weight can be included), such as Purasorb PDLG 5004, Purasorb PDLG 5002, Purasorb PDLG 7502, Purasorb PDLG 5004A, Purasorb PDLG 5002A, resomer RG755S, Resomer RG503, Resomer RG502, Resomer RG503H, Resomer RG502H, RG752, RG752H, or combinations thereof. In some cases, it is preferred that the solute is substantially insoluble in water (it is convenient to use water as the second liquid). If the second liquid comprises water, it is preferred that the solvent is a water-miscible organic solvent, such as dimethyl sulfoxide (DMSO), n-methyl pyrrolidone, hexafluoro-isopropanol, glycofurol, PEG200 and PEG400.

The weight average molecular weight (MW) of the polymer may be from 4 to 700 kDaltons, particularly if the polymer comprises a poly (α-hydroxy) acid. If the polymer comprises a copolymer of lactic and glycolic acid (often called "PLGA"), said polymer may have a weight average molecular weight of from 4 to 120 kDaltons, preferably of from 4 to 15 kDaltons.

If the polymer comprises a polylactide, said polymer may have a weight average molecular weight of from 4 to 700 kDaltons.

The polymer may have an inherent viscosity of from 0.1-2 dl/g, particularly if the polymer comprises a poly (α-hydroxy) acid. If the polymer comprises a copolymer of lactic and glycolic acid (often called "PLGA"), said polymer may have an inherent viscosity of from 0.1 to 1 dl/g, and optionally of from 0.14 to 0.22 dl/g. If the polymer comprises a polylactide, said polymer may have an inherent viscosity of from 0.1 to 2 dl/g, and optionally of from 0.15 to 0.25 dl/g. If the polymer comprises a polyglycolide, said polymer may have an inherent viscosity of from 0.1 to 2 dl/g, and optionally of from 1.0 to 1.6 dl/g. It is preferred that the first liquid comprises a target material which is desired to be encapsulated within the solid beads. The target material may be incorporated in the first liquid as a particulate or may be dissolved. The target material may comprise a pharmaceutically active agent, or may be a precursor of a pharmaceutically active agent. The pharmaceutically active agent may be, for example, any agent that is suitable for parenteral delivery, including, without limitation, fertility drugs, hormone therapeuticals, protein therapeuticals, anti-infectives, antibiotics, antifungals, cancer drugs, pain-killers, vaccines, CNS drugs, and immunosupressants. The delivery of drugs in polymer beads, especially by controlled release parenteral delivery, has particular advantages in the case of drugs which, for example, have poor water-solubility, high toxicity, poor absorption characteristics, although the invention is not limited to use with such agents. The active agent may be, for example, a small molecular drug, or a more complex molecule such as a polymeric molecule. The pharmaceutically active agent may comprise a peptide agent. The term "peptide agent" includes poly(amino acids), often referred to generally as "peptides", "oligopeptides", "polypeptides" and "proteins". The term also includes peptide agent analogues, derivatives, acylated derivatives, glycosylated derivatives, pegylated derivatives, fusion proteins and the like. Peptide agents which may be used in the method of the present invention include (but are not limited to) enzymes, cytokines, antibodies, vaccines, growth hormones and growth factors. Further examples of suitable peptide agents are given in US2007/0196416 (see, in particular, paragraphs [0034] to [0040]). The pharmaceutically active agent may be a gonadotropin releasing hormone receptor (GnRHR) agonist. Gonadotropin releasing hormone receptor agonists are often known to those skilled in the art as gonadotropin releasing hormone (GnRH) agonists. For example, the GnRHR agonist may be leuprorelin (commonly known as leuprolide) or a precursor thereof.

The target material (especially in the case of an pharmaceutically active agent or a precursor thereof) may be provided in an amount of 2-60% w/w compared to the weight of the polymer, optionally from 5 to 40% w/w, further optionally from 5 to 30% w/w and more optionally from 5-15% w/w.

If the target material comprises a peptide agent, the first liquid may comprise one or more tertiary structure alteration inhibitors. Examples of tertiary structure alteration inhibitors are: saccharides, compounds comprising saccharide moieties, polyols (such as glycol, mannitol, lactitol and sorbitol), solid or dissolved buffering agents (such as calcium carbonate and magnesium carbonate) and metal salts (such as $CaCl_2$, $MnCl_2$, NaCl and $NiCl_2$). The first liquid may comprise up to 25% w/w tertiary structure alteration inhibitors, the weight percentage of the tertiary structure alteration inhibitor being calculated as a percentage of the weight of the polymer. For example, the first liquid may comprise from 0.1 to 10% w/w (optionally from 1 to 8% w/w and further optionally from 3 to 7% w/w) metal salt and 0.1 to 15% w/w (optionally from 0.5 to 6% w/w and further optionally from 1 to 4% w/w) polyol.

The second liquid may comprise any liquid in which the solute (typically a polymer) is substantially insoluble. Such a liquid is sometimes referred to as an "anti-solvent". Suitable liquids may include, for example, water, methanol, ethanol, propanol (e.g. 1-propanol, 2-propanol), butanol (e.g. 1-butanol, 2-butanol or tert-butanol), pentanol, hexanol, heptanol, octanol and higher alcohols; diethyl ether, methyl tert butyl ether, dimethyl ether, dibutyl ether, simple hydrocarbons, including pentane, cyclopentane, hexane, cyclohexane, heptane, cycloheptane, octane, cyclooctane and higher hydrocarbons. If desired, a mixture of liquids may be used.

The second liquid may be provided as a flow of second liquid, and the method may comprise contacting the liquid droplets with a flow of second liquid. Contacting the droplets with a flow of second liquid is advantageous because the flow of second liquid carries droplets from the site at which droplets initially impact the second liquid, thereby effectively spacing the droplets relative to one another (and the beads formed therefrom). This decreases the chance of droplets coalescing. The spacing of adjacent droplets/beads in the flow of second liquid may be at least two times (optionally at least 3 times, optionally less than 5 times, and optionally less than 10 times) the mean diameter of the droplets. This may be achieved by suitable correlation of the discharge frequency of a dispensing mechanism and the flow rate of the second liquid. The flow rate of the second liquid may be at least 50 ml/min.

It is therefore preferred that the method comprises initially contacting the liquid droplets with the second fluid in a first position and collecting the solid beads downstream of the first position.

The method of the present invention may comprise separating the solid beads from the second liquid.

The second liquid preferably comprises water, optionally with one or more surface active agents, for example, alcohols, such as methanol, ethanol, propanol (e.g. 1-propanol, 2-propanol), butanol (e.g. 1-butanol, 2-butanol or tert-butanol), isopropyl alcohol, Polysorbate 20, Polysorbate 40, Polysorbate 60 and Polysorbate 80. Surface active agents, such as alcohols, reduce the surface tension of the second liquid receiving the droplets, which reduces the deformation of the droplets when they impact the second liquid, thus decreasing the likelihood of non-spherical droplets forming. This is particularly important when the extraction of solvent from the droplet is rapid.

If the second liquid comprises water and one or more surface active agents, the second liquid may comprise a surface active agent content of from 1 to 95% v/v, optionally from 1 to 30% v/v, optionally from 1 to 25% v/v, further optionally from 5% to 20% v/v and further more optionally from 10 to 20% v/v. The % volume of surface active agent is calculated relative to the volume of the second liquid.

It is possible that the composition of the second liquid may vary as a function of distance from the point at which the liquid droplets first contact the second liquid. For example, the concentration of surface active agent in the second liquid may vary as a function of the distance from the point at which the liquid droplets first contact the second liquid. For example, at the point at which the droplets contact the second liquid, the concentration of the surface active agent may be relatively high (for example, 30-50% v/v) to facilitate the formation of spherical beads. Downstream of the point at which the droplets first contact the second liquid, the concentration of surface active agent may be lower. This may be achieved, for example, by introducing more of that liquid which makes up the majority of the second liquid (such as water) to the flow of the second liquid. The introduction of said liquid may increase the rate at which the solvent is extracted from the droplets so as to form beads.

The method of the present invention may therefore comprise, subsequent to contacting said droplets with the second liquid, reducing the concentration of surface active agent in the second liquid surrounding said droplets.

The concentration of surface active agent in the second liquid downstream of the point at which droplets are first contacted with the second liquid may therefore be lower than the concentration of surface active agent in the second liquid at the point at which droplets are first contacted with the second liquid.

It is preferred that the second liquid comprises water (i.e. is aqueous), and has a surface tension of less than 60 mNm$^{-1}$, optionally less than 50 mNm$^{-1}$, optionally less than 40 mNm$^{-1}$ and optionally less than 35 mNm$^{-1}$ If a target material is provided in the first liquid, the second liquid may be provided with one or more osmolarity altering agents, such as salts and/or polyols. The osmolarity altering agents are added to the second liquid to produce an osmolarity which assists in retaining the target material inside the beads, once formed, by inhibiting a significant amount of diffusion of the target material into the second liquid. The osmolarity altering agent may comprise metal salts (such as chlorides of sodium and magnesium) and polyols, such as glycol, mannitol, lactitol and sorbitol.

The total concentration of osmolarity altering agents may be from 0.1 to 2M, typically from 0.2 to 1M and optionally from 0.3 to 0.8M. For example, a second liquid may comprise a 0.4M solution of NaCl and a 0.4M solution of sorbitol, the second liquid therefore comprising a total concentration of osmolarity altering agents of 0.8M.

The temperature of the second liquid as it is first contacted by the droplets may be ambient temperature or above. There is generally no need in the method of the present invention to cool the second liquid in order to cool the droplets. It may be desirable sometimes for the second liquid to be at less than ambient temperature. The temperature of the second liquid as it is first contacted by the droplets may be from 0 to 25° C., optionally from 5 to 20° C., optionally from 5 to 15° C. and optionally from 5 to 10° C. It has been found that the temperature of the second liquid may affect one or more characteristics of the beads so produced. For example, it has been found that when the second liquid is at a lower temperature, then the beads made may contain a larger amount of load (such as a pharmaceutical), may be less porous and release the load over a longer time scale.

The pH of the second liquid may be from 3 to 10, for example. It has been found that the pH of the second liquid may have an effect on the surface morphology of the bead.

In the region of the second liquid in which the droplets first contact the second liquid, the second liquid may have a depth of at least 0.1 mm, optionally at least 0.3 mm, and further optionally a depth of from 0.3 to 3 mm.

In the region of the second liquid in which the droplets first contact the second liquid, the second liquid may have a depth of at least twice the mean greatest dimension of the droplets, optionally at least three times the mean greatest dimension of the droplets and further optionally a depth of between three times and fifty times the mean greatest dimension of the droplets.

If the step of generating droplets is performed using a piezoelectric component, then the step of generating liquid droplets may comprise applying an electrical signal to the piezoelectric component. The frequency of the electrical signal may be from 200 to 10000 Hz, optionally from 400 to 6000 Hz and further optionally from 500 to 4000 Hz. The signal shape may be square, for example. The signal may have a pulse length of from 3 to 50 µs, optionally from 5 to 30 µs and further optionally from 7 to 20 µs. The gap between pulses may be from 400 to 2000 µs. For example, if the frequency of the electrical signal is from 500-800 Hz, the gap between pulses may typically be from 1200 to 1600 µs. For example, if the frequency of the electrical signal is from 1700-2300 Hz, the gap between pulses may typically be from 400 to 600 µs. The voltage of the signal may be from 30 to 100V and optionally from 40 to 80V.

The method may comprise heating the first liquid prior to the formation of liquid droplets. The first liquid may be heated to a temperature of from 50 to 100° C. and optionally from 50 to 80° C. Heating the first liquid reduces the viscosity, thereby facilitating the formation of droplets.

The method may comprise heating the second liquid, optionally prior to contacting liquid droplets with the second liquid.

The method may optionally comprise cooling the second liquid, optionally prior to contacting liquid droplets with the second liquid. It has been found that the temperature of the second liquid may affect one or more characteristics of the solid bead formed from the liquid droplet (such as bead porosity, for example). For example, the temperature of the second liquid may affect one or more of the size, porosity and efficiency with which the based encapsulates any load, such as a pharmaceutical.

The method may comprise providing one or more of:
One or more flow channels in which the second liquid flows;
One or more liquid droplet generators for generating droplets of the first liquid;
One or more means for producing the flow of the second liquid;
One or more supports for supporting the liquid droplet generator; and
One or more signal generators for controlling the operation of the liquid droplet generator.

The dimensions of a flow channel in which the second liquid flows may vary according to typical experimental conditions. For example, the length of a flow channel may be dictated to some extent by the speed of desolvation of a liquid droplet and the flow rate of the second liquid through a flow channel. Typically, the length of a flow channel may be from 10 to 1000 mm, optionally from 20 to 200 mm and further more optionally from 30 to 100 mm.

At least one (optionally more than one, further optionally a majority of and further more optionally each) flow channel may have a substantially uniform cross section.

At least one (optionally more than one, further optionally a majority of and further more optionally each) flow channel may be substantially U shaped in cross-section. The shape is simple to manufacture. The U shape may be a round bottomed or flat-bottomed U shape.

At least one (optionally more than one, further optionally a majority of and further more optionally each) flow channel may be substantially V shaped in cross-section.

The depth of at least one (optionally more than one, further optionally a majority of and further more optionally each) flow channel may be greater than its width. Such an arrangement may provide shielding of the droplets (which typically have a low mass) from any ambient air movements.

The width of at least one (optionally more than one, further optionally a majority of and further more optionally each) flow channel may be from 0.5 to 20 mm, optionally from 1 to 10 mm and further optionally from 2 to 6 mm. Such a channel is sufficiently wide to enable relatively simple setting-up of the apparatus whilst not requiring large volumes of second liquid. For example, alignment of a droplet generator and a flow channel is simplified by having a flow channel of such width.

The depth of at least one (optionally more than one, further optionally a majority of and further more optionally each) flow channel may be from 0.5 to 20 mm, optionally from 1 to 10 mm and further optionally from 2 to 10 mm. Such a channel is sufficiently deep to provide some shielding from any ambient air movements which may have an unwanted effect on the droplets.

It is preferred that the length of the flow channel downstream of the point at which a droplet first contacts the second liquid is at least 1 times (optionally at least 2 times and further optionally at least 3 times) greater than the length of the flow channel upstream of said droplet introduction point.

The flow channel may be formed in a flow channel carrier.

The flow channel may be laterally movable. This may assist in the alignment of the flow channel and the liquid droplet generator relative to one another (this being important in ensuring that the droplets generated by the liquid droplet generator fall into the flow channel). In this connection, the flow channel carrier (if present) may be mounted for lateral movement.

The flow channel may be pivotally movable. This may assist in the alignment of the flow channel and the liquid droplet generator relative to one another (this being important in ensuring that the droplets generated by the liquid droplet generator fall into the flow channel). In this connection, the flow channel carrier (if present) may be mounted for pivotal movement.

The method may comprise providing a means for aligning the flow channel and liquid droplet generator relative to one another to ensure that the liquid droplet generator is operable to dispense droplets into the second liquid in the flow channel.

The means for aligning the flow channel and liquid droplet generator may comprise one or more alignment surfaces for contacting the flow channel carrier (if present), contact of the one or more alignment surfaces with the flow channel carrier causing the flow channel carrier to be aligned to receive droplets from the liquid droplet generator. The means for aligning the flow channel and liquid droplet generator may comprise two alignment surfaces, typically one either side of the flow channel carrier. At least part of at least one of the alignment surfaces may be curved. The two alignment surfaces may define a spacing therebetween. The spacing between the two alignment surfaces may be larger at one end of the alignment surfaces than at the other end. This facilitates simple alignment of the flow channel relative to the droplet generator.

The one or more alignment surfaces may be associated with the liquid droplet generator. The apparatus may be provided with a liquid droplet generator support, in which case the one or more alignment surfaces may be integral with, or attached to, the liquid droplet generator support. Such an arrangement facilitates the alignment of the flow channel relative to the liquid droplet generator. Typically, translational movement of the liquid droplet generator and the two alignment surfaces causes the flow channel carrier to be received in the spacing between the two alignment surfaces. The spacing between the two alignment surfaces is such that, when the flow channel carrier is in its final position, the flow channel and liquid droplet generator are aligned properly so that droplets may be dispensed into the centre of the flow channel.

The flow channel may be tilted. Tilting the flow channel assists in the movement of beads along the channel and helps prevent beads from adhering to the end of the channel. This may be an issue if the channel is formed in a material which does not have a low surface energy, such as material being steel. The angle of tilt may be from 0.5 to 30° and optionally from 1 to 20°.

The angle of tilt may be variable, for example, from 0.5 to 30° and optionally from 1 to 20°.

The method may comprise providing a means for tilting the flow channel. The means for tilting the flow channel typically comprises a means for tilting the flow channel carrier (if the apparatus comprises a flow channel carrier). The means for tilting the flow channel may be operable to vary the angle of tilt. The means for tilting the flow channel may comprise one or more (and typically two) first surfaces associated with the flow channel and one or more (and typically two) second surfaces associated with the liquid droplet generator, each first surface engaging with a corresponding second surface to tilt the flow channel. One or more (and typically each) of the first surfaces typically faces substantially downwards. One or more (and typically each) of the second surfaces typically faces upwards. At least one (and typically each) of the first surfaces may be provided by a laterally-projecting lip, which may project inwardly or outwardly. The apparatus typically comprises two such lips, one either side of the flow channel. At least one of the first surfaces may be sloped relative to the flow channel. At least one (and typically each) of the second surfaces may be provided by a projection. Said projections may optionally project outwardly.

Typically, movement of the liquid droplet generator causes movement of the at least one second surface, movement of the at least one second surface relative to the first surface causing the degree of tilt of the flow channel to change.

The droplet generator (if present) may comprise a droplet-generating orifice. The closest spacing between the droplet generating orifice and the surface of a flow of second liquid may typically be from 1 to 50 mm, optionally from 1 to 30 mm, further optionally from 2 to 25 mm and more optionally from 3 to 20 mm.

Typically a flow of second liquid may be from 0.5 to 2 mm deep, and so the closest spacing between the droplet generating orifice and the bottom of a flow channel may typically be from 3 to 50 mm, optionally from 3 to 30 mm, further optionally from 4 to 25 mm and more optionally from 4 to 20 mm.

The method may comprise providing a heater operable to heat the second liquid. The method may comprise providing a cooler operable to cool the second liquid.

For the avoidance of doubt, solid beads may be in the form of gels.

It is possible that the first liquid need not comprise a solute dissolved in a solvent. It may be possible for the first liquid to comprise a carrier liquid in which solid particulate is dispersed. Likewise, the liquid dispensed by the liquid droplet generator in the apparatus mentioned above may comprise a carrier liquid in which solid particulate is dispersed.

In accordance with a sixth aspect of the present invention, there is provided one or more beads made or makeable by a method in accordance with the method of the first, second, third, fourth or fifth aspect of the present invention.

The present invention will now be described by way of example only with reference to the following figures of which:

Figure 1:
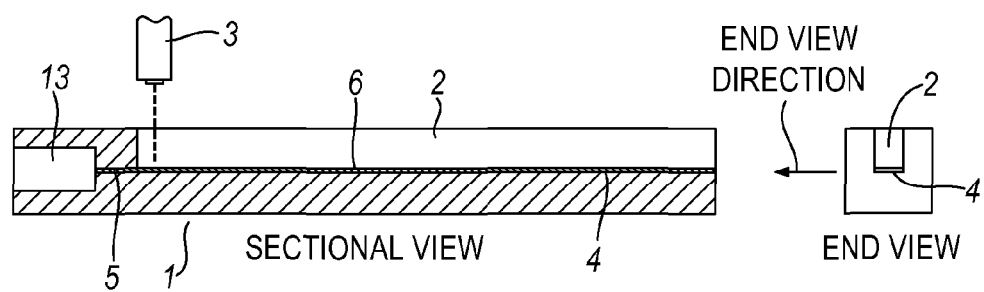
FIG. 1 shows a cross-sectional view of an example of an embodiment of an apparatus used in the method of the present invention.

FIG. 1 shows an example of an apparatus used in the method of the present invention. FIG. 1 shows a side-on cross-section through the apparatus and an end-on view of part of the apparatus. The apparatus is denoted generally by reference numeral 1, and comprises a flow channel 2 in spaced relationship with a piezoelectric droplet generator 3 [Microdrop Technologies GmbH, Norderstedt, Germany]. The channel 2 is formed in 316 stainless steel, and has two parts; a first "open" portion denoted generally by reference numeral 6, this portion of the channel being 6 mm deep and 12 mm wide, and a second (enclosed) portion 5. A nozzle (not shown) is inserted into cavity 13 and a pump (not shown) delivers a liquid 4 into flow channel 2. The pump is an annular gear pump, but may be any pulseless flow device. The distance between the dispensing nozzle (not shown) of the piezoelectric droplet generator and the surface of the liquid 4 is 12 mm. The liquid in the present case is 15% v/v tert-butyl alcohol (Sigma Aldrich, UK) in water. The depth of liquid is determined by the height of the enclosed portion 5 of the flow channel 2. In the present case, the depth of the liquid 4 is about 0.5 mm. The flow rate of the liquid 4 was about 60 ml/min. This is calculated from the volumetric flow rate and cross section of the flow profile.

Droplets of polymer dissolved in a solvent were dispensed by piezoelectric droplet generator 3 as follows. A 20% w/v solution of a copolymer of lactic and glycolic acids (Resomer RG752H, Boehringer Ingelheim, Germany) in dimethyl sulfoxide (DMSO) was prepared. Leuprolide was also dissolved in the DMSO, the amount of leuprolide being 12.5% w/w compared to the weight of the polymer. The piezoelectric droplet generator 3 was used to dispense droplets of the polymer solution by applying an electric signal of a frequency of 2000 Hz, a pulse length of 7 microseconds and a voltage of 82V to the piezoelectric droplet generator 3. The dispensing nozzle of the piezoelectric droplet generator 3 was heated to a temperature of 70° C. to facilitate dispensing of the liquid. The droplets of polymer solution were dispensed into the flow of liquid 4 a distance of about 80 mm from the end of flow channel 2. The continuously flowing liquid 4 ensured that droplets and beads in the flowing liquid are spaced from one another so that they do not coalesce. It is believed that the DMSO dissolves in the liquid 4, to generate a solid bead. DMSO is miscible with the water/alcohol mixture (liquid 4), but the PLGA polymer is insoluble in the water/alcohol mixture.

Figure 2A:
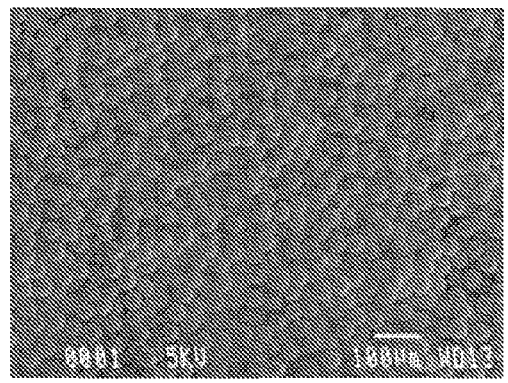
FIGS. 2A and 2B are scanning electron micrograph images of beads made using the apparatus of FIG. 1.
Figure 2B:
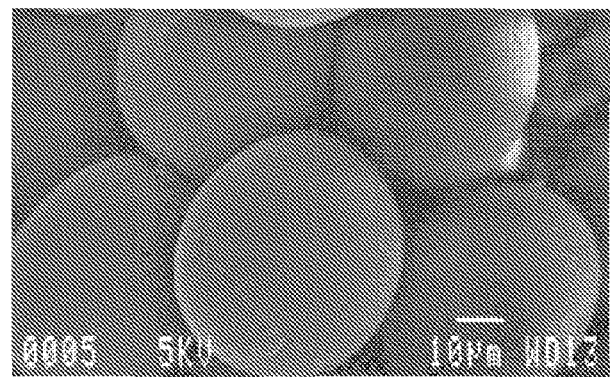
Figure 3:
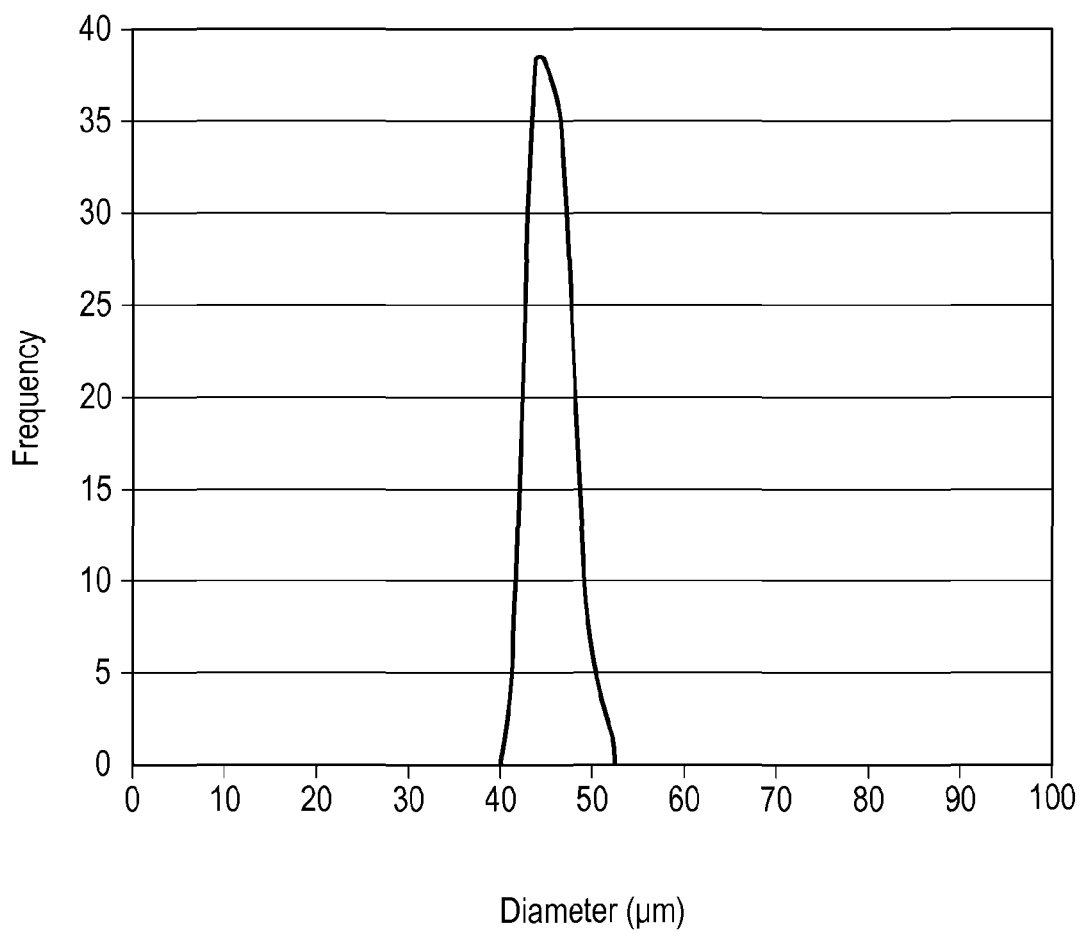
FIG. 3 is a histogram showing the size distribution of beads made using the apparatus of FIG. 1.

The liquid 4 was collected as it left the flow channel 2. It was found that the droplets had already formed solid beads by the time that they had left the flow channel 2, indicating that desolvation of the droplets has been rapid. FIGS. 2A and 2B show electron microscopy images of the beads made as described. Those figures show the sphericity of the beads and their monodisperse nature. A histogram showing the size distribution of the beads of FIGS. 2A and 2B is shown in FIG. 3. The mean bead diameter was 45 μm, with a coefficient of variation of 5%. The beads, once isolated from the liquid 4, were a fine, free-flowing white powder. The beads could be resuspended in a liquid carrier and passed through a suitably-sized hypodermic needle (such as a 23G or 27G needle).

The surface tension of liquid 4 which receives the droplets was measured to be about 30.5 $mNm^{-1}$ using a Wilhelmy plate method. The experiment described above was repeated using water as liquid 4 i.e. without any tert-butyl alcohol. The droplets formed lenticular beads i.e. beads in the shape of a lens. The beads appeared to be large in—diameter in comparison to the spherical beads generated when the alcohol was used. Furthermore, the beads did not appear to be as monodisperse as the spherical beads made when the alcohol was used. The measured surface tension of water was 68 $mNm^{-1}$. Whilst not wishing to be bound by theory, it is thought that the higher surface tension of the water (when used without alcohol) causes greater deformation of the droplet when it impacts the surface of the liquid. Furthermore, the DMSO may leave the liquid droplet more quickly when immersed in water alone than when immersed in a mixture of water and tert-butyl alcohol. The DMSO may therefore leave the droplet, when immersed in water alone, before the droplet can regain its former spherical shape.

The effect of changing the polymer concentration in the solvent was investigated using the general method described above in relation to FIGS. 1, 2A, 2B and 3. The liquid receiving the droplets was a 15% v/v solution of tert-butyl alcohol in water. The solvent was DMSO and the polymer was Resomer RG752H (Boehringer Ingelheim, Germany). The mean bead diameter, coefficient of variation, and mean encapsulation efficiency are shown in Table 1 as a function of the concentration of the polymer solution used to make the droplets.

TABLE 1

| Polymer conc (% w/v) | Mean diameter (μm) | Coefficient of variation | Mean encapsulation efficiency (%) |
| --- | --- | --- | --- |
| 10 | 34.9 | 0.072 | 33.3 |
| 20 | 39.1 | 0.069 | 43.5 |
| 30 | 47.6 | 0.041 | 56.6 |
| 40 | 49.6 | 0.056 | 59.5 |

The mean encapsulation efficiency was measured using HPLC analysis. One technique which could be used to measure mean encapsulation efficiency is the British Pharmacopeia technique, as is well known to those skilled in the art.

The beads showed a high sphericity. Furthermore, in each case, it is estimated that the beads were formed (i.e. the droplets desolvated) in a matter of 5-15 seconds.

Attempts were made to make beads using a liquid comprising 5% w/v of polymer in solvent. The beads made using this solution were ill-defined and polydisperse and were formed in low yield.

The data of Table 1 demonstrate that it is possible to make monodisperse solid beads quickly with a suitable encapsulation efficiency, and to tune bead characteristics by adapting the method used to make the beads.

Beads were made by depositing droplets comprising 20% w/v PLGA in DMSO solvent and 10% w/w leuprolide acetate (10% weight peptide in relation to weight of polymer) into a mixture of water and tert-butanol (85%:15%) which acted as an antisolvent as described above. The effect of the temperature of the droplet-receiving liquid on the physical structure of the beads so produced was studied using scanning electron microscopy (SEM). When the temperature of the droplet-receiving liquid was approx. 18° C., SEM images indicated that the beads had a smooth surface morphology and had a highly porous internal structure. When the temperature of the droplet-receiving liquid was approx. 12° C., the beads had a more dense internal structure, and the pores inside the bead were of smaller size. When the temperature of the droplet-receiving liquid was approx. 5° C., SEM images indicated that the beads had a more dense internal structure. It is anticipated that the internal structure of the bead has an effect on the timescale over which any loading within the bead is released. It is therefore possible to use the temperature of the droplet-receiving liquid to alter the load-release characteristic of the bead.

Further beads were made by depositing droplets comprising 40% w/v PLGA in DMSO and 20% leuprolide into a mixture of water and tert-butanol (85%:15%) which acted as an antisolvent as described above. The effect of the temperature of the droplet-receiving liquid on the mean bead diameter and encapsulation efficiency was investigated, and the results shown in Table 2:

TABLE 2

| Antisolvent temperature (° C.) | Mean diameter (μm) | Encapsulation efficiency (%) |
| --- | --- | --- |
| 20 | 53 | 41 |
| 9.6 | 42 | 59 |
| 4.9 | 36 | 68 |

Table 2 indicates that it is possible to change the size and encapsulation efficiency by changing the anti-solvent temperature.

Figure 4:
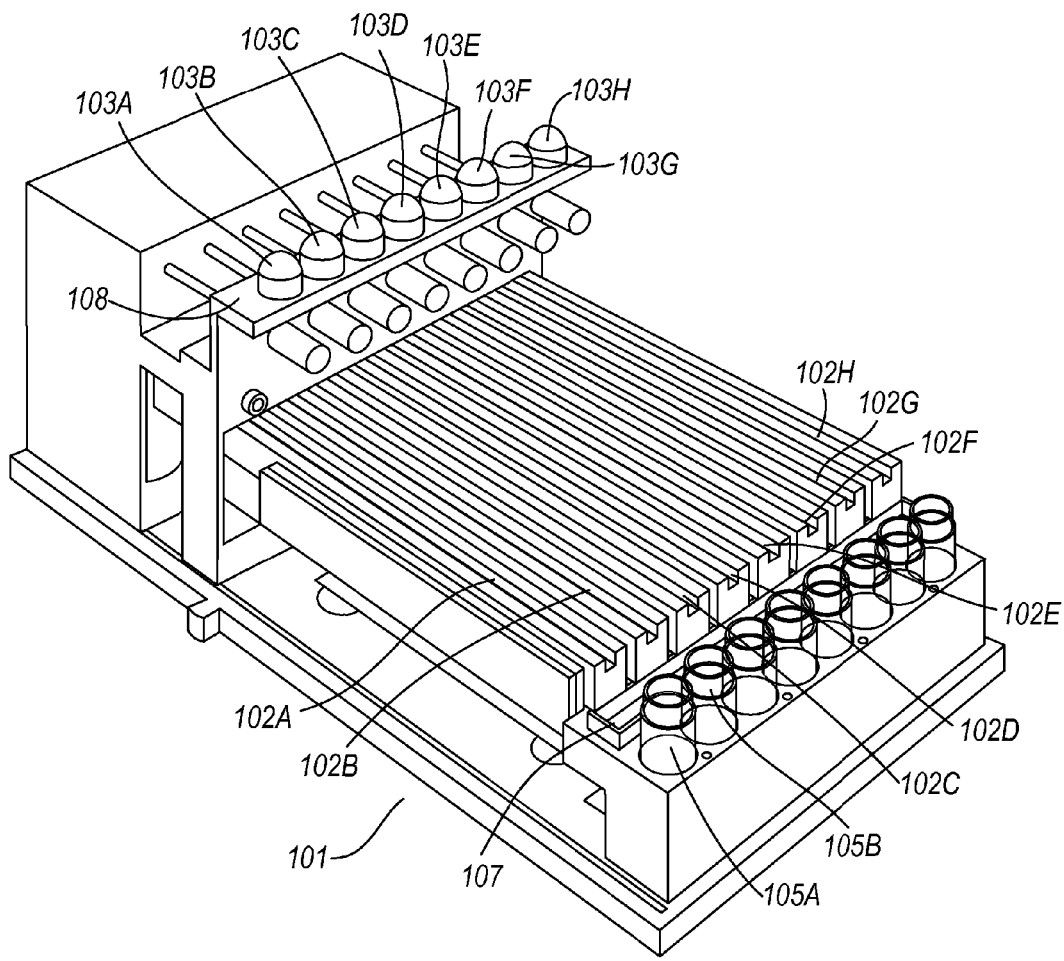
FIG. 4 shows a further example of an embodiment of an apparatus in accordance with the present invention.

FIG. 4 shows a further example of an embodiment of an apparatus in accordance with the present invention. The apparatus, denoted generally by reference numeral 101, comprises eight piezoelectric droplet generators 103a-h, each being located directly above a corresponding flow channel 102a-h. Each piezoelectric droplet generator 103a-h and flow channel 102a-h is operable to generate solid beads substantially as described above in relation to FIG. 1. A bead receiving trough 107 is provided to receive beads from all of the flow channels 102a-h. Eight waste receptacles (only two of which are labelled for clarity, 105a, 105b) are provided to receive waste from the piezoelectric droplet generators 103a-h during start up and cleaning. A video camera (not shown) is provided above each flow channel 102a-h to facilitate monitoring of the bead production process. A support 108 is provided which supports the piezoelectric droplet generators 103a-h in spaced relationship to the respective flow channels 102a-h.

The trough 107 may be replaced by a plurality of individual troughs, each individual trough being arranged to receive beads from one (and only one) flow channel.

Figure 5:
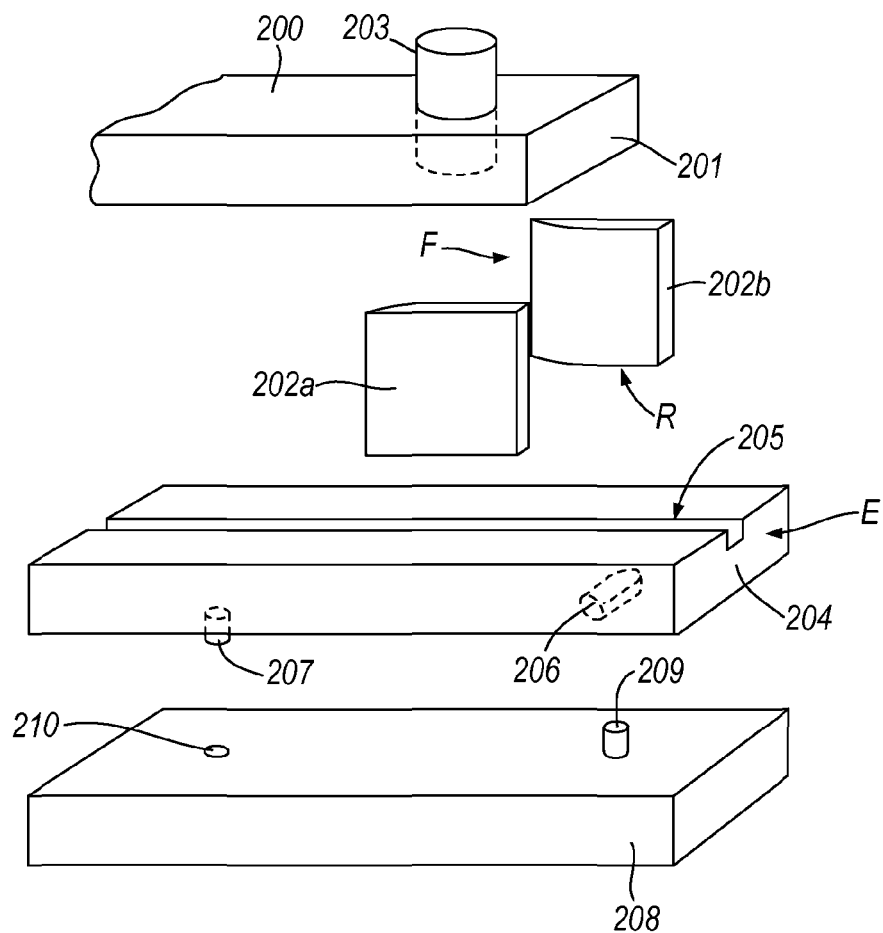
FIG. 5 is an exploded view of part of a further example of an apparatus used in an example of a method in accordance with the present invention.
Figure 6:
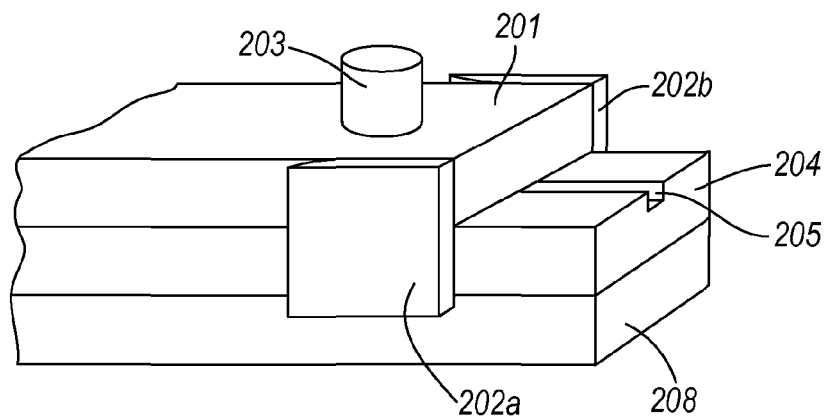
FIG. 6 is a perspective view of the part of the apparatus shown in FIG. 5.

A further embodiment of an apparatus for use in a method in accordance with the present invention will now be described with reference to FIGS. 5 and 6. The apparatus is denoted generally by reference numeral 200. The apparatus 200 comprises a base 208, a fluid channel carrier 204 and a liquid droplet generator support 201. The fluid channel carrier 204 is provided with a channel 205 which, in use, carries a fluid into which droplets of liquid are deposited using the liquid droplet generator 201. The fluid channel carrier 204 is pivotally attached to the base 208. Pin 207 provided on the fluid channel carrier 204 is inserted into aperture 210 formed in base 208. Pin 209 provided on based 208 is inserted into slot 206 provided in the fluid channel carrier 204. The slot 206 is arcuate and permits pivotal movement of the fluid channel carrier 204 about the pivotal axis formed by pin 207 and aperture 210. The pivotal movement of the fluid channel carrier 204 facilitates alignment of the fluid channel 205 and the liquid droplet generator 203 as will now be described. Liquid droplet generator 203 is mounted on a liquid droplet generator support 201. The support is provided with two side portions, 202a, 202b. These are shown as being detached from the rest of the support 201 in FIG. 5, but this is merely for illustrative purposes. When the apparatus 200 is being set-up, fluid channel carrier 204 is placed on top of base 208. Liquid droplet generator support (with the liquid droplet generator 203 in place) is placed on top of the fluid channel carrier 204, with the end (E) of fluid channel carrier 204 being placed between the forward-most parts of side portions 202a, 202b, the forward-most parts being denoted by F. The spacing between the forward-most parts of the side portions is greater than the width of the fluid channel carrier 204. The liquid droplet generator support 201 is then moved across the fluid channel carrier 204 (in this case, from right to left in FIGS. 5 and 6) so that fluid channel carrier 204 is located between the side portions 202a, 202b as is shown in FIG. 6. The spacing between the side portions 202a, 202b at the rear of the side portions (the rear being denoted R) is essentially the same as the width of the fluid channel carrier 204 so that the fluid channel carrier 204 fits snugly between the rear parts of the side portions 202a, 202b. This snug fit ensures that the fluid channel 205 is correctly aligned with the liquid droplet dispenser 203 every time the apparatus 200 is set-up.

Figure 7:
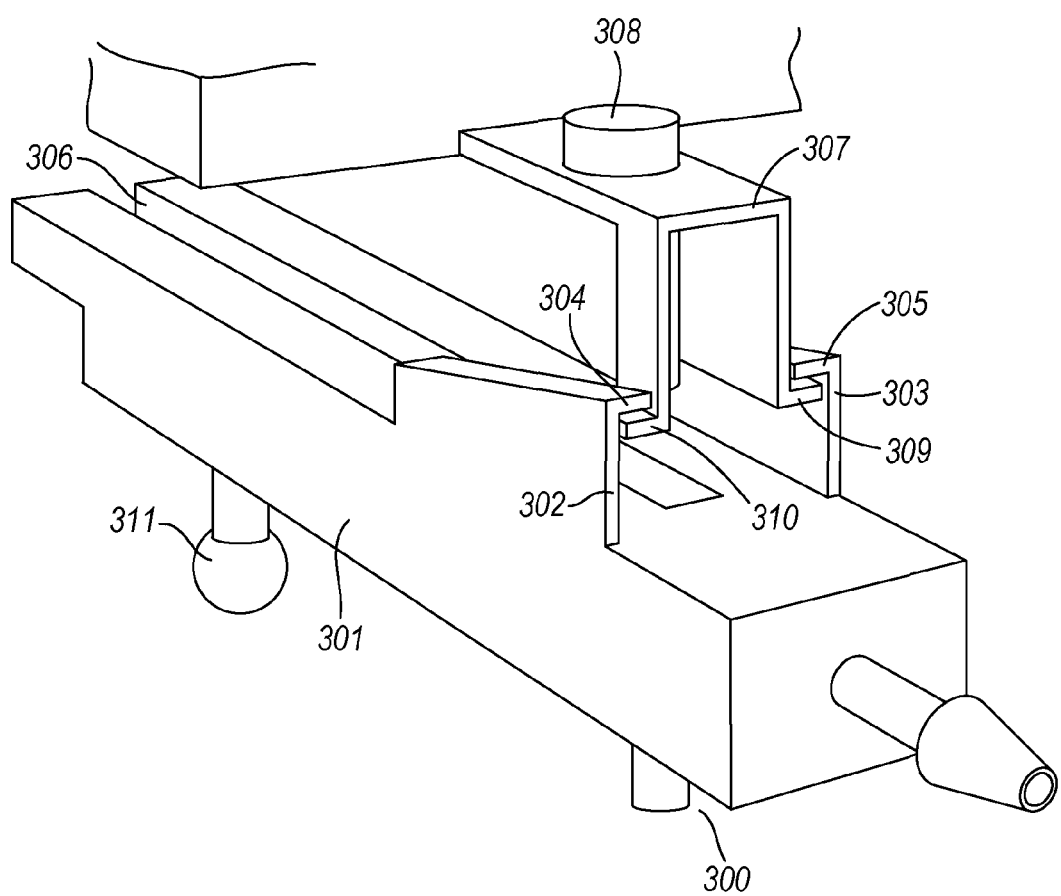
FIG. 7 is a perspective view of a prophetic further example of an apparatus for us in an example of a method in accordance with the present invention.

A prophetic example of a further embodiment on an apparatus suitable for use in a method in accordance with the present invention will now be described with reference to FIG. 7. The apparatus is denoted generally by reference numeral 300. The apparatus 300 comprises a liquid droplet dispenser 308 located above a fluid channel 306 so that liquid droplets may be dispensed from the dispenser 308 into a liquid provided in the fluid channel 306. The liquid droplet dispenser 308 is supported by a liquid droplet dispenser support 307. The support 307 is provided with two outwardly-projecting wing portions 309, 310. The upper surface of each wing portion 309, 310 contacts the lower surface of inwardly-projecting lips 304, 305 attached to the fluid channel carrier 301 with legs 302, 303. The lips 304, 305 are angled as shown in FIG. 7. Movement of the support 307 relative to the fluid channel carrier 301 causes the wing portions 309, 310 to move along lips 304, 305 respectively. This movement, coupled with the angled nature of the lips 304, 305, causes the fluid channel carrier 301 to tilt, the fluid channel carrier 301 tilting about ball joint 311. Tilting of the fluid channel has proved to be beneficial in helping to prevent beads from sticking to the end of the channel 306, which may happen if the channel 306 is formed in a material which does not have a low surface energy.

Beads have been produced which contain active ingredients other than leuprolide. For example, beads have been made which encapsulate leuprolide acetate, octreotide acetate, Exenatide acetate and salmon calcitonin. For example, those skilled in the art will realise that beads may be used to encapsulate pharmaceutically-active materials (or precursors thereof) which do not comprise peptides.

Beads have been produced from droplets using a solvent other than DMSO. For example, N-methylpyrrolidone (often known as NMP) and mixtures of glycofurol and polyethylene glycol) have been used. Those skilled in the art will realise that other liquids may be used to form droplets.

Beads have been produced by depositing droplets into a variety of droplet-receiving liquids. For example, various mixtures of water and alcohols have been used. The alcohols used include tert-butyl alcohol and iso-propyl alcohol.

The effect of pH on the morphology of the beads has been investigated by forming beads generally as mentioned above and depositing them into a liquid at a given pH (the chosen pH typically being from 3 to 9). The surface morphology of the beads was then determined using SEM. Qualitative data indicate that a low pH may cause the formation of the smooth surface morphology. It may therefore be possible to adapt the pH of the liquid into which the droplets are deposited to change the morphology of the bead to be produced.

It is desirable to remove the beads from the liquid. The beads may be filtered, for example, using a mesh (e.g. PharmaSep, Sweco, USA), which may be arranged to vibrate. Other appropriate vacuum filtration systems or devices may also be used. Alternatively, the beads may be separated by density separation (for example, by being allowed to sink to the bottom of a suitably shaped receptacle).

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of forming solid beads, comprising:
providing a first liquid comprising a solute, a solvent, and a target material which is to be encapsulated within the solid beads, the solute comprising a polymer, wherein a concentration of the polymer in the first liquid being at least 10% w/v, 'w' being the weight (g) of the polymer and 'v' being the volume (mL) of the solvent, the target material comprising a pharmaceutically active agent or a precursor of a pharmaceutically active agent;
providing a liquid droplet generator comprising a piezoelectric component operable to generate liquid droplets;
causing the liquid droplet generator to form liquid droplets of the first liquid;
passing the liquid droplets through a gas;
providing a second liquid as a flow; and
contacting the liquid droplets with the flow of the second liquid so as to cause the solvent to exit the liquid droplets, thus forming solid beads,
the solubility of the solvent in the second liquid being at least 5 g of solvent per 100 ml of second liquid, and the solvent being miscible with the second liquid.

2. The method according to claim 1, wherein the beads have a coefficient of variation of the greatest dimension of the beads of 0.1 or less, the coefficient of variation being the standard deviation of the greatest dimension of the beads divided by the mean greatest dimension.

3. The method according to claim 1, wherein the concentration of the polymer in the first liquid is from 15 to 35% w/v.

4. The method according to claim 1, wherein the time taken for the formation of solid beads from initial contact of the liquid droplet with the second liquid is less than 2 minutes.

5. The method according to claim 1, comprising ejecting said liquid droplets through a gas into contact with the second liquid.

6. The method according to claim 1, wherein the solid beads have a mean greatest dimension of from 10 to 200 μm.

7. The method according to claim 1, wherein the second liquid comprises water and the solvent is a water-miscible organic solvent.

8. The method according to claim 1, the target material being incorporated in the first liquid as a particulate or in solution.

9. The method according to claim 8, wherein the polymer includes a biocompatible polymer.

10. The method according to claim 9, wherein the target material is provided in an amount of 5-30% w/w compared to the weight of the polymer.

11. The method according to claim 9, wherein the target material comprises a peptide agent, and the first liquid comprises one or more tertiary structure alteration inhibitors.

12. The method according to claim 1, wherein the second liquid is provided as a flow of second liquid, and the method comprises contacting the liquid droplets with the flow of second liquid.

13. The method according to claim 1, comprising heating the first liquid prior to the formation of liquid droplets.

14. The method according to claim 1, comprising cooling the second liquid.

15. A method of forming solid beads, the method comprising:
providing a first liquid comprising a solute, a solvent, and a target material which is to be encapsulated within the solid beads, the solute comprising a co-polymer of lactic and glycolic acid, the concentration of said co-polymer in the first liquid being at least 10% w/v, 'w' being the weight (g) of said co-polymer and 'v' being the volume (mL) of the solvent, the target material comprising octreotide acetate or a precursor thereof;
providing a liquid droplet generator comprising a piezoelectric component operable to generate liquid droplets;
causing the liquid droplet generator to form liquid droplets of the first liquid;
passing the liquid droplets through a gas;
providing a second liquid as a flow; and
contacting the liquid droplets with the flow of the second liquid so as to cause the solvent to exit the droplets, thus forming solid beads,
the solubility of the solvent in the second liquid being at least 5 g of solvent per 100 ml of second liquid, and the solvent being miscible with the second liquid.

* * * * *